Patented Feb. 19, 1946

2,395,265

UNITED STATES PATENT OFFICE 2,395,265

PREPARATION OF DIOXOLANE POLYMERS

William Franklin Gresham, Wilmington, Del., assignor to E. I. du Pont de Nemours & Company, Wilmington, Del., a corporation of Delaware No Drawing. Application May 20, 1942,
Serial No. 443,815

9 Claims. (Cl. 260—338)

This invention relates to a process for the preparation of polymeric compounds and more particularly to polymeric compounds from ethylene oxide and formaldehyde.

An object of the present invention is to provide an economical process for the preparation of 1,3-dioxolane polymers. Another object is to provide a process for the preparation of 1,3-dioxolane polymers by the interaction of ethylene oxide and formaldehyde in the presence of an acidic catalyst. A further object is to provide surface acting agents from ethylene oxide, formaldehyde, and hydroxyl and/or carboxyl containing organic compounds. Other objects and advantages of the invention will hereinafter appear.

1,3-dioxolane (hereinafter referred to as dioxolane) can be prepared by contacting formaldehyde with ethylene oxide. This reaction may be effected by the introduction of gaseous ethylene oxide into a cooled aqueous solution of formaldehyde such as formalin and after the initial, fairly vigorous, exothermic reaction subsides, completing the reaction by mildly heating the reaction mixture. The reaction occurs spontaneously in the presence of suitable acidic type catalysts such, for example, as sulfuric acid, paratoluene sulfonic acid, camphor sulfonic acid, hydrochloric acid, or other acid catalysts of this general character and especially the boron fluoride type catalysts, such as boron fluoride per se, or boron fluoride combined as a complex with other compounds such as water. Such catalysts should preferably be present in amounts ranging from 0.001 to 1.0 part thereof per part of the formaldehyde reacted.

Inasmuch as the reaction occurs spontaneously in the presence of the acidic type catalyst and as the reaction is exothermic, temperature controlling means are usually required in order to cool the reaction mixture during the initial stages of the reaction. It has been found that the reaction is initiated even at temperatures in the proximity of 0° C. and it has likewise been found desirable to raise the temperature of the reaction mixture after the initial highly exothermic reaction has subsided. This may be accomplished by a final heating of the reaction mixture to a temperature between 60 and 150° C. If desired, the reaction may be carried out at sub-, normal, or superatmospheric pressures.

The example which follows illustrates one method of making dioxolane in which parts are by weight unless otherwise indicated.

*Example 1.*—To 163 parts of 37% aqueous formaldehyde cooled in an ice bath was added 108 parts of gaseous ethylene oxide. The cold homogeneous solution so obtained was then treated with 2.7 parts of $BF_3.2.7H_2O$. After mixing thoroughly a fairly vigorous exothermic reaction set in. When this subsided the reaction mixture was heated for 0.5 hour on the steam bath and then distilled. Dioxolane, 66 parts, was obtained as its water azeotrope (6.7% water, B. P. 70–73° C.).

Recent developments have shown that dioxolane, although it is a 5-membered cyclic ring, can be converted to valuable high molecular weight polymers. The dioxolane obtained in accord with the above disclosed process may therefore be reacted in accord with well-known polymerization procedure, namely by heating the dioxolane in the presence of an acidic type catalyst until a polymer of the desired molecular weight has been obtained. A feature of the present invention, however, involves the direct preparation from formaldehyde and ethylene oxide of polymeric dioxolane, i. e. a compound which contains at least two dioxolane groups, the single group having the structure —$OCH_2OCH_2CH_2$—. This may be accomplished by carrying out the reaction of formaldehyde and ethylene oxide as disclosed above and permitting the reaction to proceed beyond the point at which dioxolane is formed. This may be done by continuing the reaction without removing the dioxolane formed or catalyst used. Temperatures between 0 and 150° C. will effect polymerization although polymerization will take place at temperatures ranging between —80 and 300° C. The polymerization, however, is more rapid at the higher temperatures and accordingly it is preferable to carry out the polymerization within the higher ranges of temperature given. Pressures likewise may be employed if desired ranging from 1 to 1000 atmospheres or higher.

The acidic type catalyst employed for effecting the initial reaction between formaldehyde and ethylene oxide may be used for polymerization also although additional acidic type catalysts such as those designated above for effecting the reaction between ethylene oxide and formaldehyde may be used.

The presence of water in the reaction during polymerization appears to inhibit the formation of high molecular weight polymers and accordingly while polymers can be obtained by the use of formalin or other more or less concentrated solutions of formaldehyde the high molecular weight polymers call for concentrated formaldehyde and for this reason paraformaldehyde and like dry forms of formaldehyde are recommended. Higher molecular weight polymers, however, may be obtained from formalin and ethylene oxide providing means are used for removing the water present. For example, the water may be removed by azeotropic distillation during the polymerization using such water withdrawing agents as benzene, toluene, etc.

The example which follows describes a preferred embodiment of the process for preparing polymers from formaldehyde and ethylene oxide in which parts are by weight unless otherwise indicated.

*Example 2.*—To 63 parts of paraformaldehyde was added 2 parts of anhydrous $BF_3$ and 108 parts of ethylene oxide while cooling in an ice bath. Reaction proceeded fairly rapidly with the formation of a viscous liquid. The reaction product which contained a small quantity of solid paraformaldehyde was finally heated at steam bath temperature for 6 hours. One-half of the viscous liquid product was treated with anhydrous ammonia to destroy the catalyst, dissolved in benzene, filtered and heated at 85–95° C. to 1 mm. to remove the solvent and monomeric dioxolane. This gave 56.5 parts of a light tan, viscous, liquid polymer which was miscible with benzene and water.

It has further been found that valuable derivatives can be prepared by the interaction of the reaction products of formaldehyde and ethylene oxide and especially the polymers of such reactions with such compounds as alcohols, acids, esters, nitriles, amines, amides, or organic compounds generally which have a reactive hydrogen atom. Highly useful products are obtained which may be used as non-ionic detergents and surface active agents by effecting such reactions with aliphatic, long-chain acids and their corresponding alcohols. Water-insoluble acids and alcohols can be rendered water soluble by this treatment and such products are especially well adapted for use in the preparation of detergents and compounds adaptable to similar uses.

In accord with another feature of the invention, it has been found that these valuable modified compounds can be prepared by a direct process whereby the alcohol, acid, ester, or other organic compound containing an active hydrogen atom is reacted with formaldehyde and ethylene oxide substantially in accord with the temperature conditions and catalyst concentrations hereinbefore described. By such processes it is possible to obtain directly valuable modified organic compounds suitable for many uses.

By the direct or indirect methods valuable modified products may be made from organic acids generally such, for example, as the mono or polycarboxylic aliphatic or aromatic, saturated or unsaturated, cyclic or alicyclic acids and it is possible to obtain the modification of any organic acids by such reactions. By way of example may be mentioned acetic, stearic, palmitic, hydroxyacetic, methoxymethoxyacetic, methacrylic, ricinoleic, cinnamic, adipic, citric, as well as the saturated and unsaturated fatty acid oils including rape, linseed, corn oils and the like.

Similarly aliphatic and aromatic alcohols may be modified and any alcohol can be so modified in accord with this feature of the invention. As examples of these alcohols may be mentioned the monohydric and polyhydric, aliphatic, aromatic, cyclic, alicyclic, saturated and unsaturated alcohols such as methanol, ethylene glycol, dodecanol, lauryl alcohol, ceryl alcohol, glycerol, maltose, lactose, and the like.

The example which follows illustrates an embodiment of the process in accord with which the above designated compounds can be modified by the indirect process.

*Example 3.*—The remainder of the product from Example 2 which still contained $BF_3$ was added to 9 parts of lauryl alcohol and the mixture heated at 85–95° C. for 5 hours. To the homogeneous reaction product was added 5 parts of 28% aqueous ammonia. Removal of lower boiling materials at 85–95° C. and finally to 1 mm. pressure gave 61 parts of a light tan, viscous liquid which was not completely miscible with water but exhibited attractive surface-active properties.

As is well known, dioxolane is useful for a great variety of applications in the art. Its polymers may be used as plasticizers, softening agents, intermediates, while the modified alcohols and acids or other derivatives have found utility in a wide variety of applications including uses as wetting agents, mercerizing agents, detergents, softening agents, plasticizers, and the like.

I claim:

1. A process for the preparation of dioxolane polymers which comprises preparing a mixture having the approximate composition: 63 parts of paraformaldehyde, 2 parts of anhydrous boron trifluoride, and 108 parts of ethylene oxide, cooling the mixture during the initial phase of the reaction, and after the initial exothermic heat of reaction subsides continuing the reaction at approximately 100° C. for six hours, subsequently neutralizing the catalyst with anhydrous ammonia, dissolving the resulting neutralized product in benzene, filtering, heating and separating the dioxolane polymer from the residue.

2. A process for the preparation of 1,3-dioxolane polymers which comprises subjecting ethylene oxide to a reaction with formaldehyde in the presence of an acidic catalyst, the reaction being conducted under such conditions that it is terminated in the substantial absence of water.

3. A process for the preparation of 1,3-dioxolane polymers which comprises subjecting ethylene oxide to a reaction with an aqueous solution of formaldehyde in the presence of sulfuric acid as the catalyst, the water present being removed during the reaction.

4. A process for the preparation of 1,3-dioxolane polymers which comprises subjecting ethylene oxide to a reaction at a temperature between 60 and 150° C. with an aqueous solution of formaldehyde in the presence of sulfuric acid as the catalyst, the water present being removed during the reaction.

5. A process for the preparation of 1,3-dioxolane polymers which comprises subjecting ethylene oxide to a reaction with an aqueous solution of formaldehyde in the presence of sulfuric acid as the catalyst, the water present being removed during the reaction by azeotropic distillation.

6. A process for the preparation of 1,3-dioxolane polymers which comprises subjecting ethylene oxide to a reaction with formaldehyde under substantially anhydrous conditions and in the presence of an acidic catalyst.

7. A process for the preparation of 1,3-dioxolane polymers which comprises subjecting ethylene oxide and paraformaldehyde at a temperature between 60 and 150° C. to a reaction in the presence of an acidic catalyst.

8. A process for the preparation of 1,3-dioxolane polymers which comprises subjecting ethylene oxide and paraformaldehyde at a temperature between 60 and 150° C. to a reaction in the presence of boron fluoride as the catalyst.

9. A process for the preparation of 1,3-dioxolane polymers which comprises subjecting ethylene oxide to a reaction with a compound of the group consisting of formaldehyde and paraformaldehyde and in the presence of an acidic catalyst, the reaction being conducted under such conditions that it is terminated in the substantial absence of water.

WILLIAM FRANKLIN GRESHAM.